United States Patent
Jeong et al.

(10) Patent No.: US 12,015,441 B2
(45) Date of Patent: Jun. 18, 2024

(54) PULSE-MATCHED FILTER-BASED PACKET DETECTION APPARATUS AND METHOD

(71) Applicants: Electronics and Telecommunications Research Institute, Daejeon (KR); Global Lifi Partners Korea Co., Ltd., Seoul (KR)

(72) Inventors: Jin Doo Jeong, Sejong-si (KR); Sang-Kyu Lim, Daejeon (KR)

(73) Assignees: ELECTRONICS AND TELECOMMUNICATIONS RESEARCH INSTITUTE, Daejeon (KR); GLOBAL LIFI PARTNERS KOREA CO., LTD., Seoul (KR)

( * ) Notice: Subject to any disclaimer, the term of this patent is extended or adjusted under 35 U.S.C. 154(b) by 37 days.

(21) Appl. No.: 17/900,403

(22) Filed: Aug. 31, 2022

(65) Prior Publication Data
US 2023/0155678 A1    May 18, 2023

(30) Foreign Application Priority Data

Nov. 18, 2021   (KR) .................. 10-2021-0159178

(51) Int. Cl.
*H04B 10/116* (2013.01)
*H04B 1/707* (2011.01)
*H04L 27/26* (2006.01)

(52) U.S. Cl.
CPC .......... *H04B 10/116* (2013.01); *H04B 1/707* (2013.01); *H04L 27/2613* (2013.01)

(58) Field of Classification Search
None
See application file for complete search history.

(56) References Cited

U.S. PATENT DOCUMENTS

| 9,025,651 B1 * | 5/2015 | Dave ............... H04B 10/2569 398/208 |
| 2006/0269283 A1 * | 11/2006 | Iwadate ........... H04B 10/0799 398/22 |

(Continued)

FOREIGN PATENT DOCUMENTS

| KR | 10-0752735 | 8/2007 |
| KR | 10-2015-0083313 | 7/2015 |

(Continued)

OTHER PUBLICATIONS

B. Sklar, "Digital Communications: Fundamentals and Applications", Prentice Hall, pp. 122-124, Second Edition.

(Continued)

*Primary Examiner* — Darren E Wolf
(74) *Attorney, Agent, or Firm* — KILE PARK REED & HOUTTEMAN PLLC (57) ABSTRACT

Provided are a pulse-matched filter-based packet detection apparatus and method. The packet detection apparatus includes a photoelectric converter for converting an optical wireless communication signal into an electrical signal, an analog-to-digital converter (ADC) for converting the electrical signal into a digital signal, a pulse-matched filter for outputting a first correlation representing a correlation between a pulse obtained by oversampling a modulated pulse and the digital signal, a correlator for outputting a second correlation representing a correlation between the first correlation and a preamble code, a packet detection signal generator for generating a packet detection signal by comparing the second correlation and a packet detection threshold value, and a demodulator for demodulating the digital signal based on the packet detection signal.

13 Claims, 6 Drawing Sheets

(56) References Cited

U.S. PATENT DOCUMENTS

| | | | | |
|---|---|---|---|---|
| 2007/0025738 | A1* | 2/2007 | Moore | H04B 10/1149 398/189 |
| 2011/0097075 | A1* | 4/2011 | Tanimura | H04B 10/07953 398/1 |
| 2013/0259490 | A1* | 10/2013 | Malouin | H04B 10/616 398/140 |
| 2016/0112143 | A1* | 4/2016 | Yu | H04B 10/6165 398/76 |
| 2021/0063656 | A1 | 3/2021 | Heo et al. | |
| 2021/0203518 | A1 | 7/2021 | Choi et al. | |

FOREIGN PATENT DOCUMENTS

| | | |
|---|---|---|
| KR | 10-1779839 | 9/2017 |
| KR | 10-2238006 | 4/2021 |

OTHER PUBLICATIONS

Webpage: 'Matched filter' from Wikipedia (https://en.wikipedia.org/wiki/Matched_filter).

Power Consumption, Science Direct (https://www.sciencedirect.com/topics/computer-science/power-consumption).

Webpage: 'Processor power dissipation' from Wikipedia (https://en.wikipedia.org/wiki/CPU_power_dissipation).

Songsong Sun et al., "Matched Filter Based Synchronizer Design for Rapid Synchronization of Packet Data Transmissions in DS-CDMA Personal Communications Systems", IEEE, 1997, pp. 5-8.

Liu et al., "Demonstration of Using Digital FIR Filter and Matched Filter to Increase Data Rate in Visible Light Communication," SPIE, vol. 8645, (2013).

Sana Ullah Jan et al., "Modeling and Analysis of DIPPM: A New Modulation Scheme for Visible Light Communications," Journal of Sensors, vol. 2015, (2015).

\* cited by examiner

PULSE-MATCHED FILTER-BASED PACKET DETECTION APPARATUS AND METHOD

CROSS-REFERENCE TO RELATED APPLICATION

This application claims the benefit of Korean Patent Application No. 10-2021-0159178 filed on Nov. 18, 2021, in the Korean Intellectual Property Office, the entire disclosure of which is incorporated herein by reference for all purposes.

BACKGROUND

1. Field of the Invention

One or more example embodiments relate to a pulse-matched filter-based packet detection apparatus and method.

2. Description of the Related Art

A communication method using light for signal transmission in free space is called optical wireless communication (OWC). Optical wireless communication is a communication method in which data is transmitted and received by modulating and demodulating light output by an infrared light source and a visible light source of an LED.

Following recent changes in which energy saving and global greenhouse gas reduction have become necessary, lighting instruments and display devices using light emitting diodes (LEDs), such as those in automobiles, traffic lights, billboards, TVs, monitors, mobile devices, special lighting, and general lighting, are rapidly spreading.

Replacing wireless communication, which is used in short-distance communication such as the office or home, with optical communication may enable transmission rates of giga bit per second (Gbps).

Optical wireless communication technology that achieves both the inherent purpose and the communicative purpose of LED light sources, by adding a communication function to LED lighting instruments and display devices, is actively being researched.

SUMMARY

Example embodiments provide an on-off keying (OOK) packet detection technology with improved signal-to-noise ratio (SNR), resolution of detection time, and detection precision based on a pulse-matched filter.

Example embodiments provide a low-power OOK packet detection technique by controlling an operation of the pulse-matched filter based on a packet detection signal and a packet demodulation completion signal.

However, the technical aspects are not limited to the aforementioned aspects, and other technical aspects may be present.

According to an aspect, there is provided a packet detection apparatus including a photoelectric converter configured to convert an optical wireless communication signal into an electrical signal, an analog-to-digital converter (ADC) configured to convert the electrical signal into a digital signal, a pulse-matched filter configured to output a first correlation representing a correlation between a pulse obtained by oversampling a modulated pulse and the digital signal, a correlator configured to output a second correlation representing a correlation between the first correlation and a preamble code, a packet detection signal generator configured to generate a packet detection signal by comparing the second correlation and a packet detection threshold value, and a demodulator configured to demodulate the digital signal based on the packet detection signal.

The optical wireless communication may be modulated by an OOK method, and the modulated pulse may be an OOK modulated pulse.

The pulse-matched filter may operate by an oversampling clock.

The preamble code may be a combination of a Barker code and an inverted Barker code.

The pulse-matched filter may be controlled based on the packet detection signal and a packet demodulation completion signal which is output by the demodulator.

The pulse-matched filter may be deactivated by the packet detection signal.

The pulse-matched filter may be activated by the packet demodulation completion signal.

According to an aspect, there is provided a packet detection method including converting an optical wireless communication signal into an electrical signal, converting the electrical signal into a digital signal, obtaining a first correlation representing a correlation between a pulse obtained by oversampling a modulated pulse and the digital signal, obtaining a second correlation representing a correlation between the first correlation and a preamble code, generating a packet detection signal by comparing the second correlation and a packet detection threshold value, and demodulating the digital signal based on the packet detection signal.

The optical wireless communication may be modulated by the OOK method, and the modulated pulse may be an OOK modulated pulse.

The first correlation may be obtained by a pulse-matched filter operating by an oversampling clock.

The preamble code may be a combination of a Barker code and an inverted Barker code.

The pulse-matched filter may be controlled based on the packet detection signal and a packet demodulation completion signal output after demodulation of the digital signal.

The pulse-matched filter may be deactivated by the packet detection signal.

The pulse-matched filter may be activated by the packet demodulation completion signal.

According to an aspect, there is provided an optical wireless communication device including a light receiving module receiving an optical signal and a packet detection apparatus configured to detect a light wireless communication signal among received optical signals, wherein the packet detection apparatus includes a photoelectric converter configured to convert the optical wireless communication signal into an electrical signal, an ADC configured to convert the electrical signal into a digital signal, a pulse-matched filter configured to output a first correlation representing a correlation between a pulse obtained by oversampling a modulated pulse and the digital signal, a correlator configured to output a second correlation representing a correlation between the first correlation and a preamble code, a packet detection signal generator configured to generate a packet detection signal by comparing the second correlation and a packet detection threshold value, and a demodulator configured to demodulate the digital signal based on the packet detection signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like elements and a repeated description related thereto has been omitted.

Figure 1:
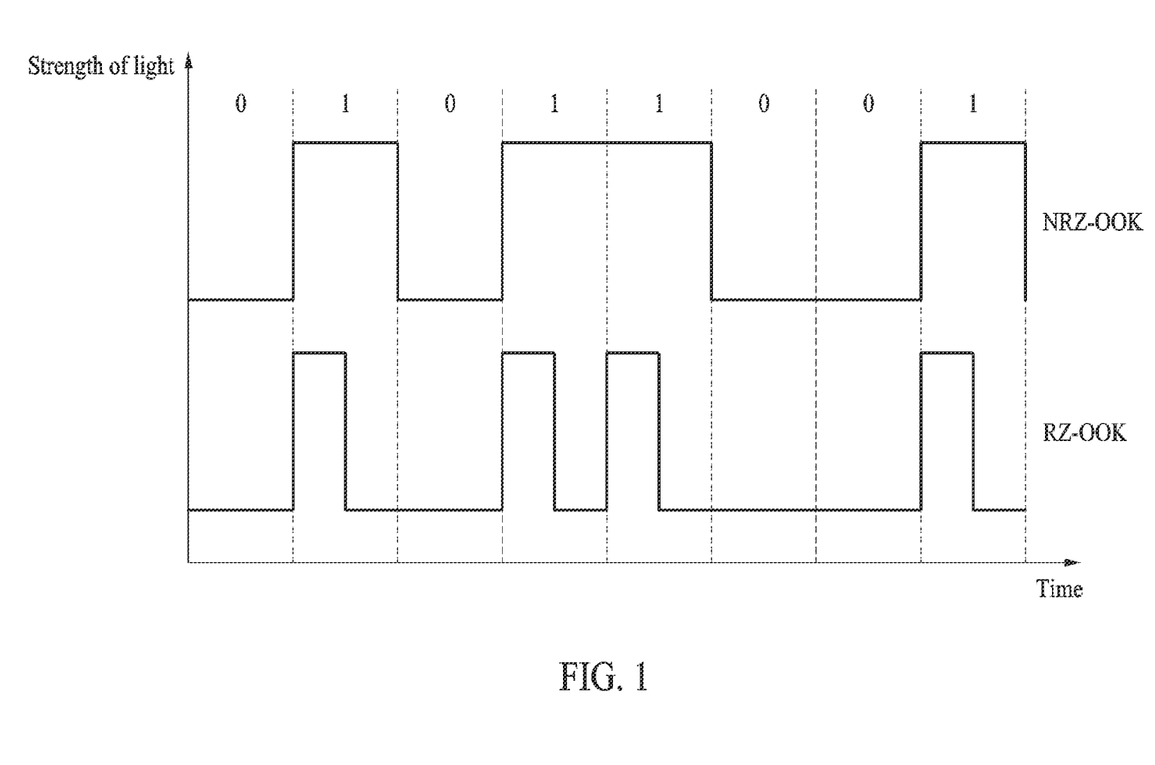
FIG. 1 is a diagram illustrating an on-off keying (OOK) modulation method.

FIG. 1 is a diagram illustrating the on-off keying (OOK) modulation method.

A visible light wireless communication technology may be a wireless communication technology which wirelessly transmits information using light in the wavelength band of visible light (380 nm to 780 nm), which can be recognized by the human eye. Visible light wireless communication technology can be freely used without permission related to frequency band, unlike the currently widely used radio frequency (RF) wireless communication. Since visible light wireless communication technology uses light in the wavelength band of visible light, the user can visually check the communication link. Visible light wireless communication technology may be a convergence technology which can simultaneously carry out the inherent purpose and the communicative purpose of a light source.

A signal modulation method mainly used for optical wireless communication, including visible light wireless communication, may be an OOK method which can reduce the complexity of a transceiver. The OOK modulation method transmits data by matching the transmission digital bit values "1" and "0" and the on and off of the light source of the transmitter, and may be a type of amplitude shift keying (ASK) method which carries and transmits data on the magnitude of a transmission signal.

FIG. 1 shows signal waveforms according to the NRZ-OOK modulation method and the RZ-OOK modulation method. NRZ is an abbreviation of non-return to zero, and NRZ-OOK modulation may be an OOK modulation method which makes the width of the pulse, which shows 1 or 0, equal to the period of the pulse.

RZ is an abbreviation of the phrase return to zero, and it may be an OOK modulation method which maintains the power-on state of the optical signal to a certain degree when a bit in which the optical strength corresponds to power-on is received among the transmission data bits, and then returns to a power-off state.

The RZ-OOK method may have less DC components than the NRZ-OOK method, but requires more bandwidth compared to the data transmission rate. A noise-robust packet detection method according to various example embodiments is described based on the NRZ-OOK method but may also be applied to the RZ-OOK method in a similar manner.

Figure 2:
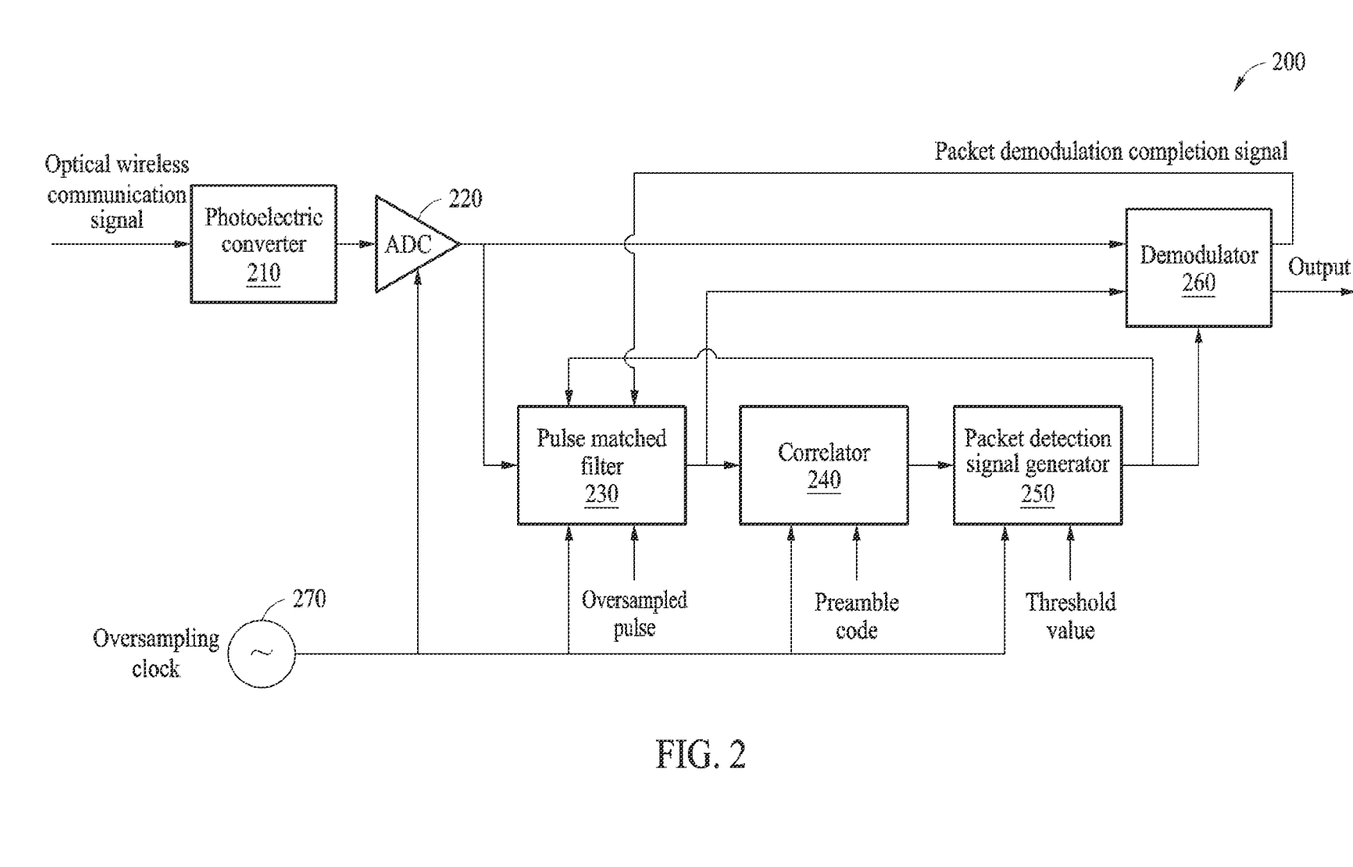
FIG. 2 is a block diagram illustrating a packet detection apparatus according to an example embodiment.

FIG. 2 is a block diagram illustrating a packet detection apparatus according to an example embodiment.

A packet detection apparatus 200 may improve the signal-to-noise ratio during OOK packet detection through the pulse-matched filter 230. The pulse-matched filter 230 of the packet detection apparatus 200 may improve the resolution of detection time and detection precision of the OOK packet by operating by an oversampling clock 270. The packet detection apparatus 200 may reduce power consumption by controlling the operation of the pulse-matched filter 230 based on the packet detection signal and the packet demodulation completion signal.

The packet detection apparatus 200 may include a photoelectric converter 210, an analog-to-digital converter (ADC) 220, a pulse-matched filter 230, a correlator 240, a packet detection signal generator 250, a demodulator 260, and an oversampling clock 270.

The photoelectric converter 210 may receive an optical wireless communication signal (e.g., a visible-light communication signal) modulated by an OOK method and convert the optical wireless communication signal into an electrical signal.

The ADC 220 may receive an electrical signal from the photoelectric converter 210 and convert the electric signal into a digital signal. The ADC 220 may operate by the oversampling clock 270.

The pulse-matched filter 230 may output a first correlation representing the correlation between a pulse obtained by oversampling an OOK modulated pulse and a digital signal. The pulse-matched filter 230 may increase the input signal and suppress noise at the moment of determining the presence of a pulse during the pulse period. The pulse-matched filter 230 may operate by the oversampling clock 270.

The pulse-matched filter 230 may be controlled based on the packet detection signal output by the packet detection signal generator 250 and the packet demodulation completion signal output by the demodulator 260. Controlling the pulse-matched filter will be described in detail with reference to FIG. 6.

The correlator 240 may output a second correlation representing the correlation between the first correlation diagram and the preamble code. The structure and operation of the correlator will be described in detail in FIG. 3. The correlator 240 may be operated by an oversampling clock 270.

The packet detection signal generator 250 may generate a packet detection signal by comparing the second correlation obtained from the correlator 240 with a packet detection threshold value. For example, if the second correlation is greater than the packet detection threshold value, a packet detection signal, which is a signal to communicate that a packet has been detected, may be generated, and if the second correlation is less than the packet detection threshold value, a signal may not be generated. The packet detection signal generator 250 may operate by the oversampling clock 270.

The packet detection signal generator 250 may contribute to controlling the operation of the pulse-matched filter 230 by feeding back the packet detection signal to the pulse-matched filter 230.

The demodulator 260 may demodulate the digital signal received from the ADC 220 when receiving the packet detection signal from the packet detection signal generator 250.

The demodulator 260 may contribute to controlling the operation of the pulse-matched filter 230 by feeding back a packet demodulation completion signal to the pulse-matched filter 230 after demodulating all digital signals.

The oversampling clock 270 may generate a clock obtained by oversampling a pulse symbol. Hereinafter, the structure and operation of the correlator 240 will be described in detail with reference to FIG. 3.

Figure 3:
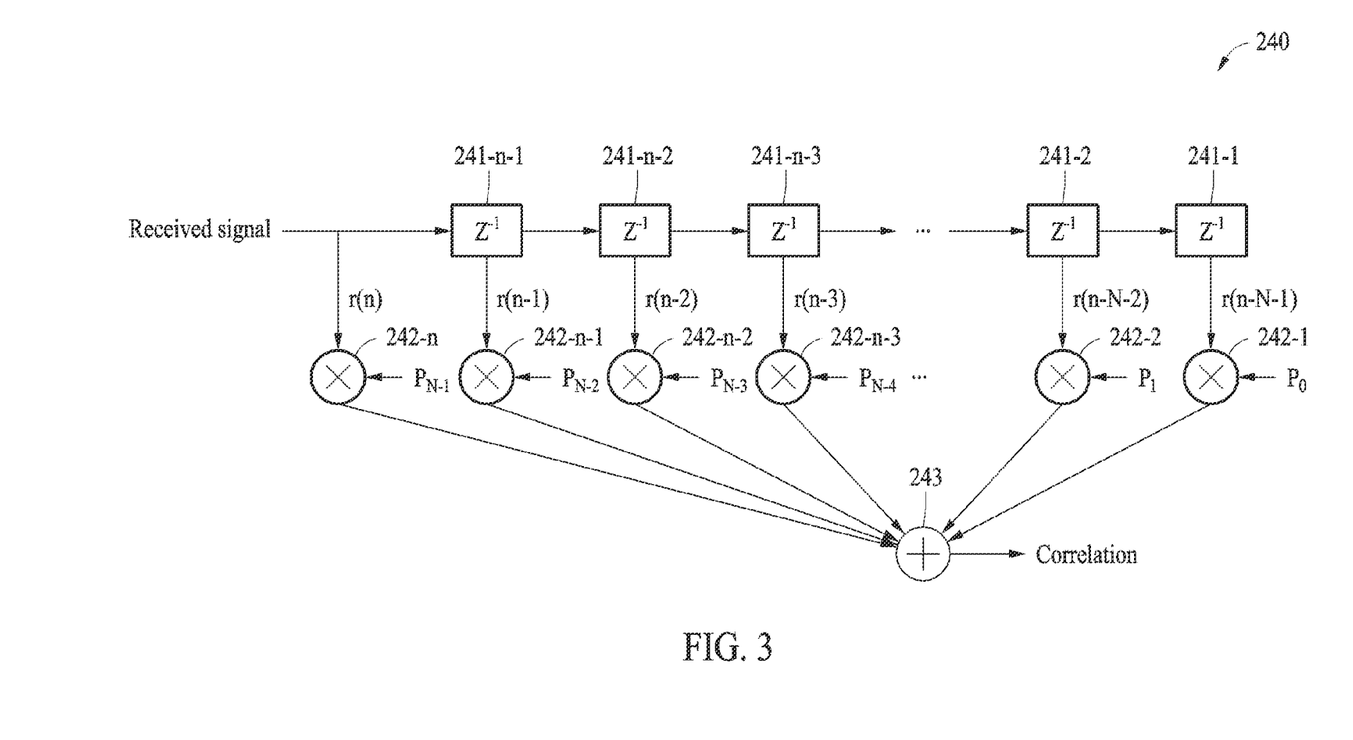
FIG. 3 is a block diagram illustrating the correlator shown in FIG. 2.

FIG. 3 is a block diagram illustrating a correlator shown in FIG. 2.

In a digital wireless communication system, a transmission signal may be transmitted in the form of a packet or a frame. A preamble field composed of a specific code may be inserted in the front part of the transmitted packet, and the receiver of the wireless communication system may detect the digital packet by detecting the preamble code. Specifically, packet detection may be performed by calculating the correlation between the received signal and the preamble code constituting the preamble field. The correlation indicates the correlation between the received signal and the preamble code, and may have a maximum value when the received signal and the preamble code are the same.

FIG. 3 is a block diagram illustrating a correlator (correlator 240 of FIG. 2) for obtaining a correlation between the preamble codes $P_{N-1}, P_{N-2}, \ldots, P_0$ of length N and the received signal (e.g., a digital signal). The correlator 240 may include a storage 241, a multiplier 242, and an adder 243.

The storage 241-1, 241-2, . . . 241-n−1 may sequentially store the data of the received signal one by one (e.g., r(n), r(n−1), . . . , r(nN−1)). The storage 241-1, 241-2, . . . , 241-n−1 may be implemented as a register.

The multipliers 242-1, 242-2, . . . 242-n may multiply the received signal (e.g., r(n), r(n−1), . . . , r(nN−1)) sequentially stored in the storage 241-1, 241-2, . . . , and 241-n−1 by the preamble codes $P_{N-1}, P_{N-2}, \ldots, P_0$, and output each correlation.

The adder 243 may output the correlation value of the received signal and the preamble code by adding each correlation received from the multipliers 242-1, 242-2, . . . 242-n.

The pulse-matched filter (the pulse-matched filter 230 of FIG. 2) may be implemented by borrowing the form of the above-described correlator 240. The pulse-matched filter 230 may output a correlation between the pulse obtained by oversampling a modulated pulse and the received signal (e.g., a digital signal). That is, the pulse-matched filter 230 may output the correlation by using a pulse obtained by oversampling a pulse used for optical wireless communication, instead of using the preamble codes $P_{N-1}, P_{N-2}, \ldots, P_0$ used in the correlator 240.

The pulse-matched filter 230 may contribute to improving the signal-to-noise ratio regardless of the shape of the applied pulse. The packet detection apparatus 200 may improve the signal-to-noise ratio compared to the conventional packet detection apparatus, by performing packet detection by adding the pulse-matched filter 230 to the existing packet detection apparatus.

Figure 4:
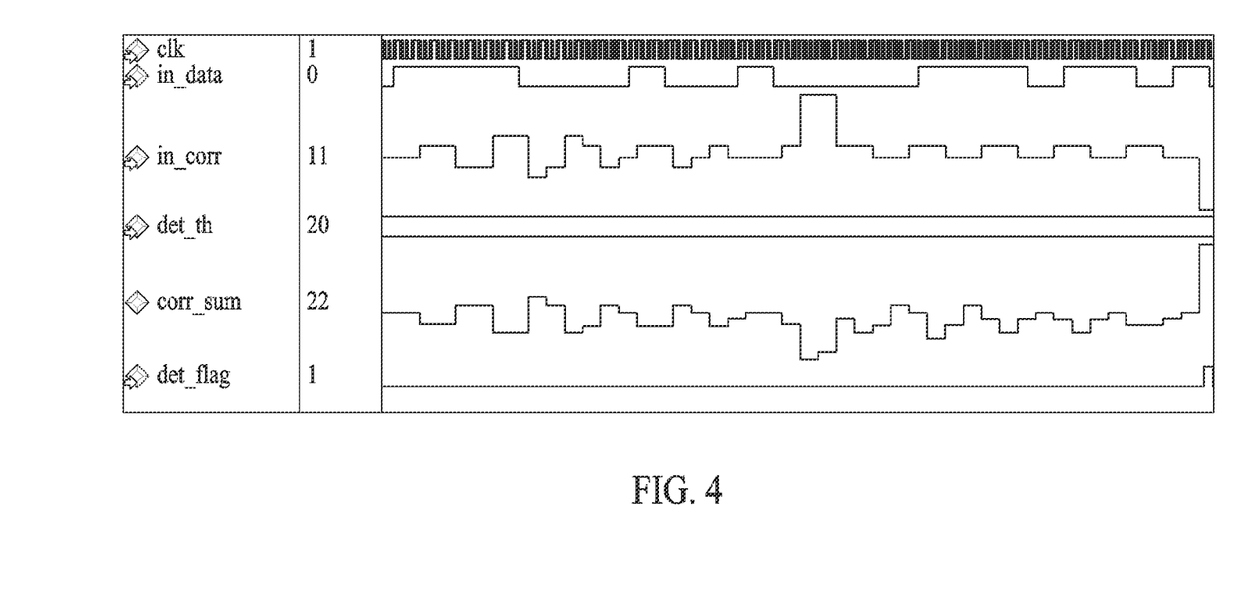
FIG. 4 is a diagram illustrating an operation of a packet detection apparatus which does not include a pulse-matched filter.

FIG. 4 is a diagram illustrating an operation of a packet detection apparatus which does not include a pulse-matched filter.

FIG. 4 shows a simulation result of the packet detection apparatus not including the pulse-matched filter. The packet detection apparatus not including the pulse-matched filter may include a photoelectric converter, an ADC, a correlator, a packet detection signal generator, a demodulator, and a clock.

The simulation may be performed by using a preamble code composed based on a code (e.g., a Barker code, a PN code, and a Gold code) having good auto-correlation. Hereinafter, a simulation using a preamble code composed based on a Barker code will be described, but the preamble code is not limited thereto, and may be composed based on a code having good auto-correlation.

The preamble code may be "11100010010" which is an 11-bit Barker code and "00011101101" which is an inverted Barker code. Also, the simulation may be performed by using a clock obtained by oversampling a pulse symbol by 8-fold. Oversampling may contribute to obtaining more information about a received signal.

The signal clk is a clock signal and may be a signal obtained by oversampling a pulse symbol by 8-fold. The signal in_data may be a received digital NRZ-OOK signal.

The signal in_corr may be a correlation between the received signal and the 11-bit Barker code. The correlator may obtain a correlation value of maximum 11 when receiving the 11-bit Barker code, and a correlation value of minimum −11 when receiving the inverted 11-bit Barker code.

The signal corr_sum may be a correlation between the received signal and the 22-bit preamble. The correlator may output the correlation of the 22-bit preamble by adding the correlation obtained by multiplying the correlation of the inverted 11-bit Barker code by −1 and the correlation of the 11-bit Barker code. The correlator can output a correlation value of up to 22.

The signal det_th may be a packet detection threshold value (e.g., 20), and a signal det_flag may be a packet detection signal generated by the packet detection signal generator. When the correlation value of the preamble becomes 22, which is greater than 20, the packet detection threshold value, the packet detection signal generator may generate the packet detection signal det_flag.

When the resolution in the time domain is the reciprocal of the shortest operation period, the resolution of the received pulse symbol may be the reciprocal of the pulse symbol period. Even if the packet detection apparatus not including the pulse-matched filter operates by an oversampling clock of 8-fold, the resolution of detection time of the packet detection apparatus may increase only by twice the pulse symbol frequency.

Figure 5:
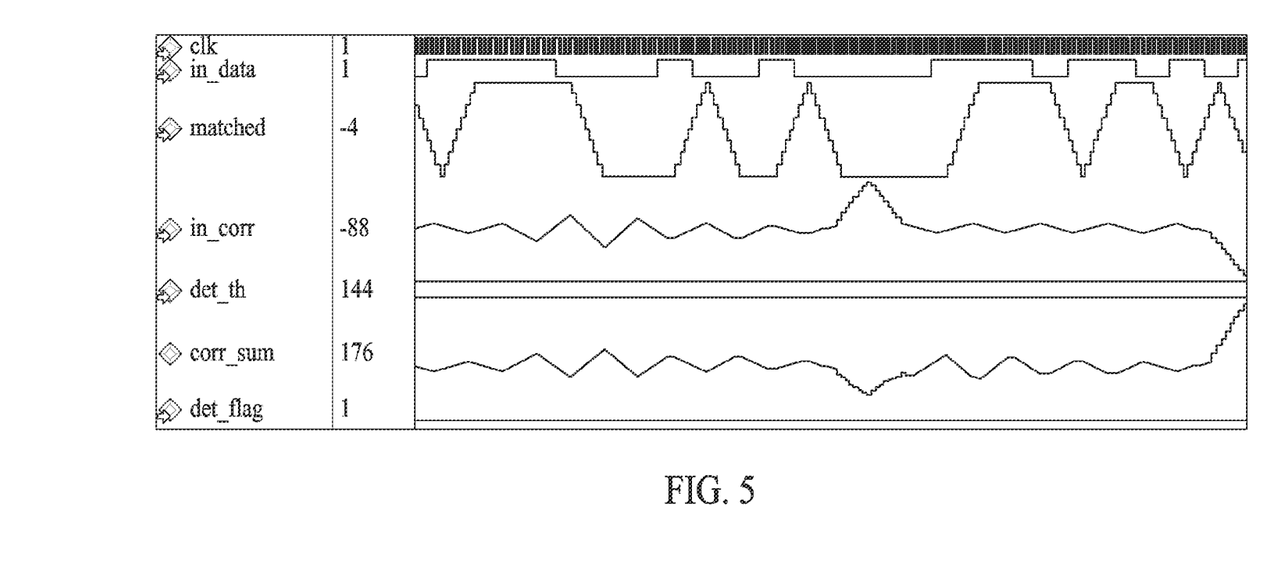
FIG. 5 is a diagram illustrating an operation of the packet detection apparatus shown in FIG. 2.

FIG. 5 is a diagram illustrating an operation of the packet detection apparatus shown in FIG. 2.

FIG. 5 shows a simulation result of the packet detection apparatus (the packet detection apparatus 200 of FIG. 2) including the pulse-matched filter. The simulation may be performed in the same environment as the above-described simulation. For example, the simulation may be performed using the preamble code composed based on a Barker code having good auto-correlation. In addition, the preamble code may be "11100010010" which is an 11-bit Barker code and "00011101101" which is an inverted Barker code, and the simulation may be performed using a clock obtained by oversampling a pulse symbol by 8-fold.

The packet detection apparatus 200 based on the pulse-matched filter 230 may increase the resolution of detection time and detection precision in packet detection by a multiple of oversampling.

The signal clk is a clock signal and may be a signal obtained by oversampling a pulse symbol by 8-fold. The signal in_data may be a received digital NRZ-OOK signal.

The signal matched may be a correlation between the received signal in_data and a pulse obtained by oversampling the modulated pulse. For example, the pulse obtained by oversampling the modulation pulse by 8-fold may be "11111111".

The signal in_corr may be a correlation of the signal matched and the 11-bit Barker code. The correlator 240 may obtain a correlation value of maximum 88 when receiving an 11-bit Barker code and a correlation value of minimum −88 when receiving an inverted 11-bit Barker code.

The signal corr_sum may be a correlation between the received signal and the 22-bit preamble. The correlator 240 may output the correlation of the 22-bit preamble by adding the correlation obtained by multiplying the correlation of the inverted 11-bit Barker code by −1 and the correlation of the 11-bit Barker code. The correlator 240 may output a maximum correlation value of 176.

The signal det_th may be a packet detection threshold value (e.g., 144), and the signal det_flag may be a packet detection signal generated by the packet detection signal generator 250. When the correlation value of the preamble is 176, which is greater than 144, the packet detection threshold value, the packet detection signal generator 250 may generate the packet detection signal det_flag.

The pulse-matched filter 230 operates by an oversampling clock of 8-fold, and the resolution of the output signal matched of the pulse-matched filter 230 may be increased by a multiple of oversampling (e.g., 8-fold). Also, the maximum value of the signal in_corr may be increased from 11 to 88, and the maximum value of the signal corr_sum may also be increased from 22 to 176, by the multiple of oversampling. The resolution of the signal in_corr and the signal corr_sum may also be increased by the multiple of oversampling.

In the case of the general packet detection apparatus of FIG. 4, the received pulse signal in_data is directly input to the correlator, and in the case of the packet detection apparatus 200 based on the pulse-matched filter 230 according to an example embodiment, the received pulse signal in_data may be input to the correlator 240 through the pulse-matched filter 230 which has the reverse order of oversampled pulses as a coefficient.

Referring to FIG. 4, even if the general packet detection apparatus uses a clock obtained by oversampling the pulse symbol clock by 8-fold as the pulse symbol clock, the resolution of the signals in_corr and corr_sum, each output by the general packet detection apparatus, may increase only by twice the pulse symbol frequency. Referring to the simulation result of FIG. 5 performed by the packet detection apparatus 200 based on the pulse-matched filter 230, the resolution of the signal in_corr and the signal corr_sum output by the packet detection apparatus 200 may increase by the multiple of oversampling (8 times).

As described above, packet detection apparatus 200 based on the pulse-matched filter 230 may increase the resolution of the detection time in packet detection by the multiple of oversampling.

Also, the packet detection apparatus 200 based on the pulse-matched filter 230 may increase detection precision in packet detection by the multiple of oversampling.

Referring to FIG. 5, since the value of the signal corr_sum increases by the multiple of oversampling from maximum 22 to maximum of 176, the range of the packet detection threshold value det_th may also increase by the multiple of oversampling. Based on the range of the increased packet detection threshold value, the packet detection threshold value can be set flexibly, and a false alarm, wherein a signal other than the preamble is detected as a packet, and a miss detection, wherein a packet detection opportunity is missed due to failing to detect the preamble signal, may be reduced. Thus, packet detection precision may increase.

Figure 6:
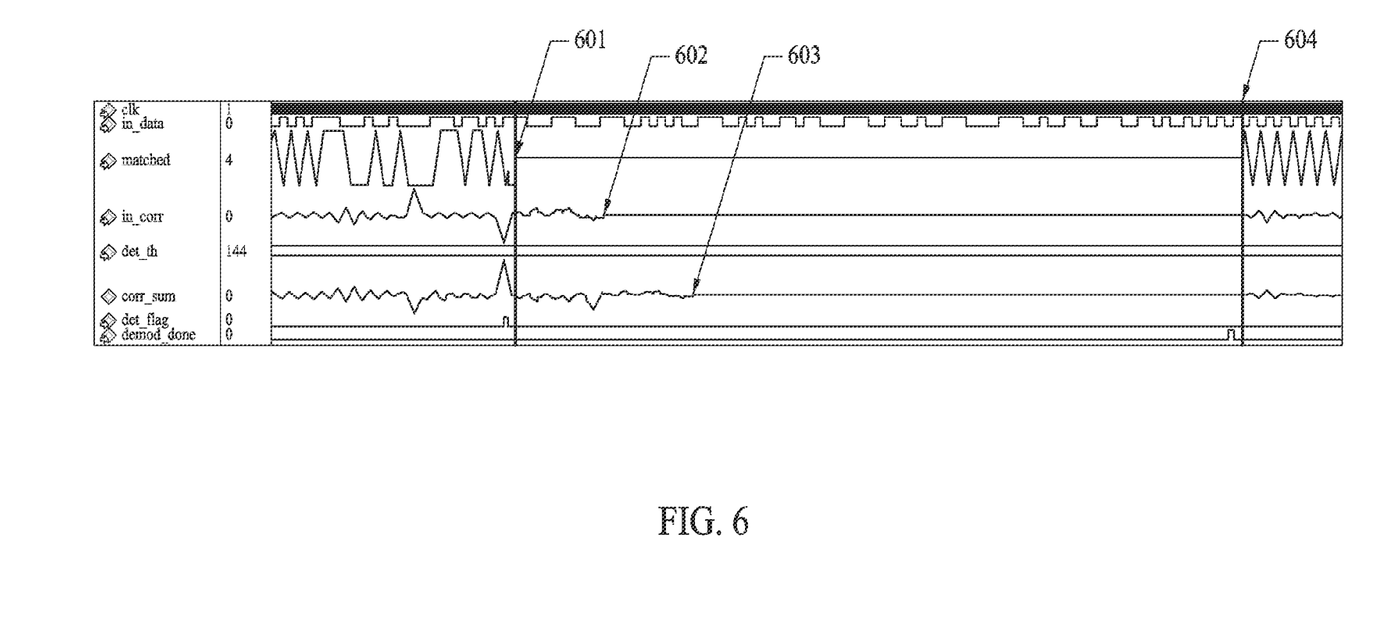
FIG. 6 is a diagram illustrating a control operation of the pulse-matched filter shown in FIG. 2.

FIG. 6 is a diagram illustrating a control operation of the pulse-matched filter shown in FIG. 2.

In many cases, a wireless communication system operates based on a battery for portability, and in this case, low power is required in the receiver. In a digital system, power consumption may be divided into dynamic power consumption and static power consumption. Dynamic power may be the power used to charge the capacitance when the signal changes between 0 and 1, and static power may be the power used even when the signal is not changing and the system is idle. Dynamic power can be calculated using Equation 1.

$$P_{dynamic} = (1/2) C V_{DD}^2 f.$$ [Equation 1]

In Equation 1, C may be a capacitance related to the charge capacity, VDD may be the voltage of the supply power, and f may be a switching frequency. Equation 1 shows that factors such as capacitance, supply voltage, and switching frequency must be decreased in order to reduce dynamic power consumption in a digital system. For example, in an idle state of a digital system in which a signal is not changed, the switching frequency becomes zero, so dynamic power is not consumed.

The packet detection module (e.g., the pulse-matched filter 230, the correlator 240, and the packet detection signal generator 250 of FIG. 2) needs to perform the role of detecting the next packet when a demodulator (e.g., the demodulator 260 of FIG. 2) detects received data through demodulation. That is, in a state in which a packet is not detected, the packet detection signal module must operate to detect a packet, but while the demodulator detects received data in a state in which a packet is detected, the packet detection module does not need to operate.

FIG. 2 shows that the packet detection signal output from the packet detection signal generator 250 is fed back and input to the pulse-matched filter 230. Also, it is shown that the packet demodulation completion signal output from the demodulator 260 is fed back and input to the pulse-matched filter 230.

The pulse-matched filter 230 including a simple monitoring/control circuit may be deactivated when a packet detection signal is confirmed while monitoring a packet detection signal, which notifies of a detection of the packet, and may be reactivated when a packet demodulation completion signal is confirmed while monitoring the packet demodulation completion signal.

Referring to the structure of the correlator 240 of FIG. 3, when the pulse-matched filter 230 confirms the packet detection signal and outputs "0" after being deactivated, the correlator 240 may also output "0". Specifically, when the values of the storage 241 receiving the output "0" of the pulse-matched filter 230 are all "0", the correlator 240 may also output "0", because it is inactivated due to the structure of the correlator 240 in which the value of the storage 241 is multiplied by and then added to the preamble code. Accordingly, the packet detection signal generator 250 receiving the output "0" of the correlator 240 may also be naturally deactivated.

When the pulse-matched filter 230 receives the packet demodulation completion signal from the demodulator 260, the pulse-matched filter 230 may be activated to output a value other than "0". Accordingly, the correlator 240 and the packet detection signal generator 250 may also be activated.

FIG. 6 shows a simulation result corresponding to the control operation of the pulse-matched filter 230. In FIG. 6, the signal demod_done may be a packet demodulation completion signal output by the demodulator 260. The remaining signals of FIG. 6 are substantially the same as the signals described above in FIG. 5, so a detailed description thereof is omitted.

At a point 601, when the packet detection signal generator 250 generates the packet detection signal det_flag and feeds it back to the pulse-matched filter 230, the pulse-matched filter 230 enters an inactive state, and the signal matched output by the pulse-matched filter 230 may continuously have a value of "0".

At a point 602, the correlator 240 receives a value of "0" continuously output by the pulse-matched filter 230 so that the signal in_corr obtained by the correlator 240 may continuously have a value of "0".

At a point 603, the signal corr_sum output by the correlator 240 may continuously have a value of "0". Accordingly, the packet detection signal generator 250 receiving the output "0" of the correlator 240 may also be deactivated. In this case, the pulse-matched filter 230, the correlator 240, and the packet detection signal generator 250 are deactivated, and power consumption may be reduced.

At a point 604, the demodulator 260 outputs a packet demodulation completion signal demod_done so that the pulse-matched filter 230, the correlator 240, and the packet detection signal generator 250 may be reactivated.

The packet detection apparatus 200 may reduce power consumption by controlling the operation of the pulse-matched filter 230 based on the packet detection signal and the packet demodulation completion signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

What is claimed is:

1. A packet detection apparatus comprising:
   a photoelectric converter converting an optical wireless communication signal into an electrical signal;
   an analog-to-digital converter (ADC) converting the electrical signal into a digital signal;
   a demodulator demodulating the digital signal based on a packet detection signal; and
   at least one digital signal processor and memory including instructions that, when executed by the at least one digital signal processor, implement:
      a pulse-matched filter generating and outputting a first correlation representing a correlation between a pulse obtained by oversampling a modulated pulse and the digital signal, the at least one digital signal processor performing the oversampling;
      a correlator generating and outputting a second correlation representing a correlation between the first correlation and a preamble code stored in the memory; and
      a packet detection signal generator generating and outputting the packet detection signal by comparing the second correlation and a packet detection threshold value,
   wherein the optical wireless communication signal is modulated by an on-off keying (OOK) method, and
   wherein the modulated pulse is used in the on-off keying (OOK) modulation method.

2. The apparatus of claim 1, wherein the pulse-matched filter operates by an oversampling clock.

3. The apparatus of claim 1, wherein the preamble code is a combination of a Barker code and an inverted Barker code.

4. The apparatus of claim 1, wherein the pulse-matched filter is controlled based on a packet demodulation completion signal output by the packet detection signal and the demodulator.

5. The apparatus of claim 3, wherein the pulse-matched filter is inactivated by the pulse detection signal.

6. The apparatus of claim 3, wherein the pulse-matched filter is activated by the packet demodulation completion signal.

7. A packet detection method comprising:
   converting an optical wireless communication signal into an electrical signal;
   converting the electrical signal into a digital signal;
   demodulating the digital signal based on a packet detection signal;
   executing, by at least one digital signal processor, instructions stored in a memory to obtain a first correlation representing a correlation between a pulse obtained by oversampling a modulated pulse and the digital signal;

executing, by the at least one digital signal processor, instructions stored in the memory to obtain a second correlation representing a correlation between the first correlation and a preamble code stored in the memory; and executing, by the at least one digital signal processor, instructions stored in the memory to generate the packet detection signal by comparing the second correlation and a packet detection threshold value, wherein the optical wireless communication signal is modulated by an on-off keying (OOK) method, and the modulated pulse is an OOK modulated pulse.

8. The method of claim 7, wherein the first correlation is obtained from a pulse-matched filter operating by an oversampling clock.

9. The method of claim 7, wherein the preamble code is a combination of a Barker code and an inverted Barker code.

10. The method of claim 8, wherein the pulse-matched filter is controlled based on a packet demodulation completion signal output after the packet detection signal and the digital signal are demodulated.

11. The method of claim 10, wherein the pulse-matched filter is inactivated by the packet detection signal.

12. The method of claim 10, wherein the pulse-matched filter is activated by the packet demodulation completion signal.

13. An optical wireless communication device comprising:

a light receiving module receiving an optical signal; and a packet detection apparatus detecting an optical wireless communication signal among the received optical signals, wherein the packet detection apparatus comprises:
    a photoelectric converter converting the optical wireless communication signal into an electrical signal;
    an analog-to-digital converter (ADC) converting the electrical signal into a digital signal;
    a demodulator configured to demodulate the digital signal based on a packet detection signal; and
    at least one digital signal processor and memory including instructions that, when executed by the at least one digital signal processor, implement:
        a pulse-matched filter generating and outputting a first correlation representing a correlation between a pulse obtained by oversampling a modulated pulse and the digital signal, the at least one digital signal processor performing the oversampling;
        a correlator generating and outputting a second correlation representing a correlation between the first correlation and a preamble code stored in the memory; and
        a packet detection signal generator generating and outputting the packet detection signal by comparing the second correlation and a packet detection threshold value, wherein the optical wireless communication signal is modulated by an on-off keying (OOK) method, and wherein the modulated pulse is used in the on-off keying (OOK) modulation method.

* * * * *